Dec. 22, 1970  J. R. PARKINSON  3,548,649
TORQUE MEASUREMENT SYSTEM UTILIZING SHAFT DEFLECTION
AND PHASE DISPLACEMENT TECHNIQUE
Filed May 27, 1969  2 Sheets-Sheet 1

INVENTOR
James R. Parkinson
BY
Edwin E. Greigg
ATTORNEY

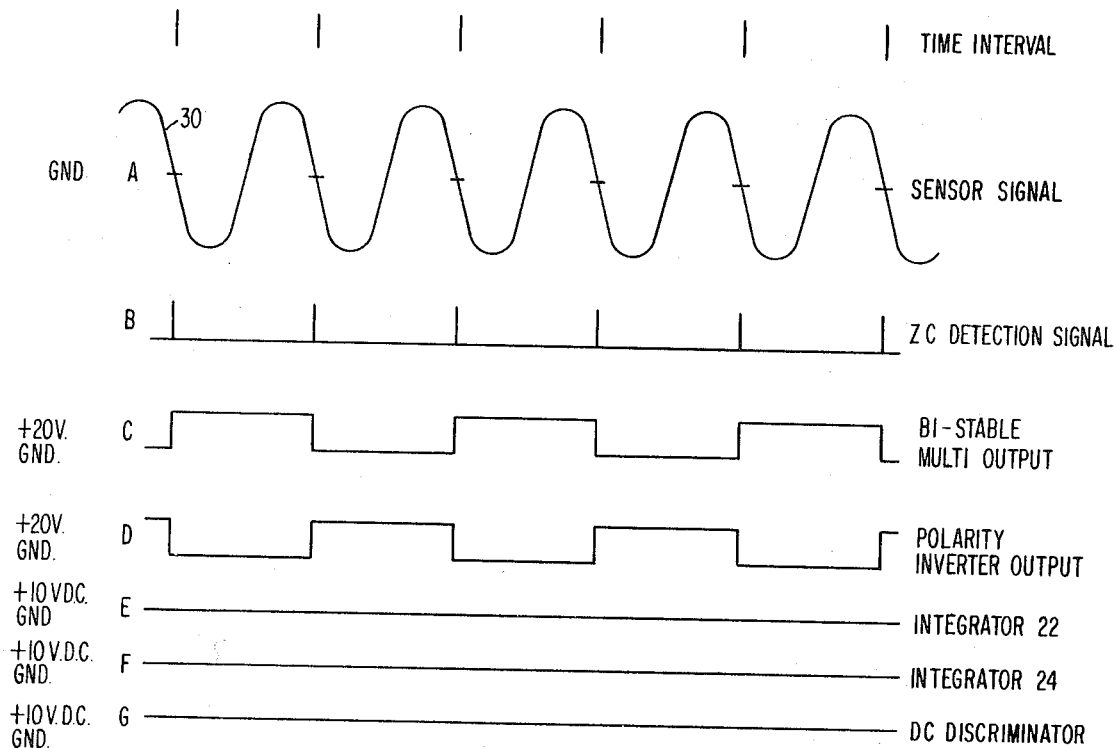
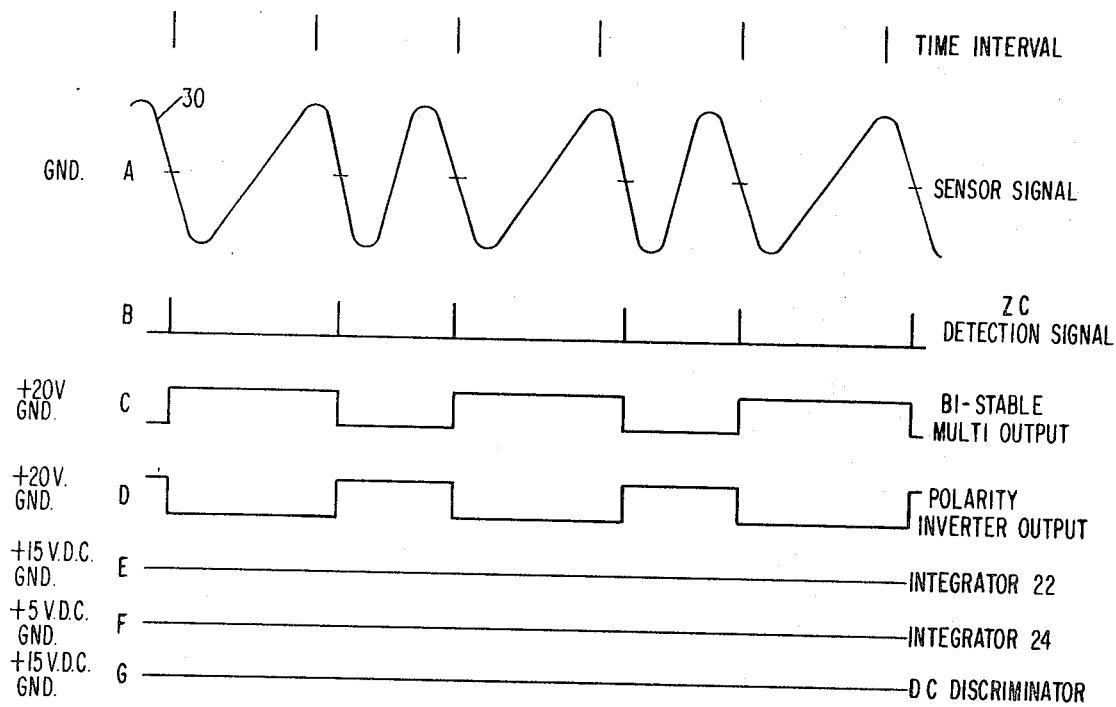

United States Patent Office 3,548,649
Patented Dec. 22, 1970

3,548,649
TORQUE MEASUREMENT SYSTEM UTILIZING SHAFT DEFLECTION AND PHASE DISPLACEMENT TECHNIQUE
James R. Parkinson, Addison, Vt., assignor to Simmonds Precision Products, Inc., Tarrytown, N.Y., a corporation of New York
Filed May 27, 1969, Ser. No. 828,217
Int. Cl. G01l 3/02
U.S. Cl. 73—136                           5 Claims

ABSTRACT OF THE DISCLOSURE

A phase displacement torque measuring system utilizing a pair of exciter wheels mounted in spaced relationship on a shaft in which each of the exciter wheels is provided with a parallel row of teeth along its periphery, with the teeth of one wheel arranged to slide between the teeth of the other wheel thus forming a row of teeth which are alternate in origin, for example, torque teeth from the torque wheel and reference teeth from the reference wheel. A single pole, variable reluctance sensor in close proximity to the rotating wheels provides an AC signal in which any two adjacent cycles of the signal will be controlled by the relative position between the two rotating wheels.

---

Figure 1:
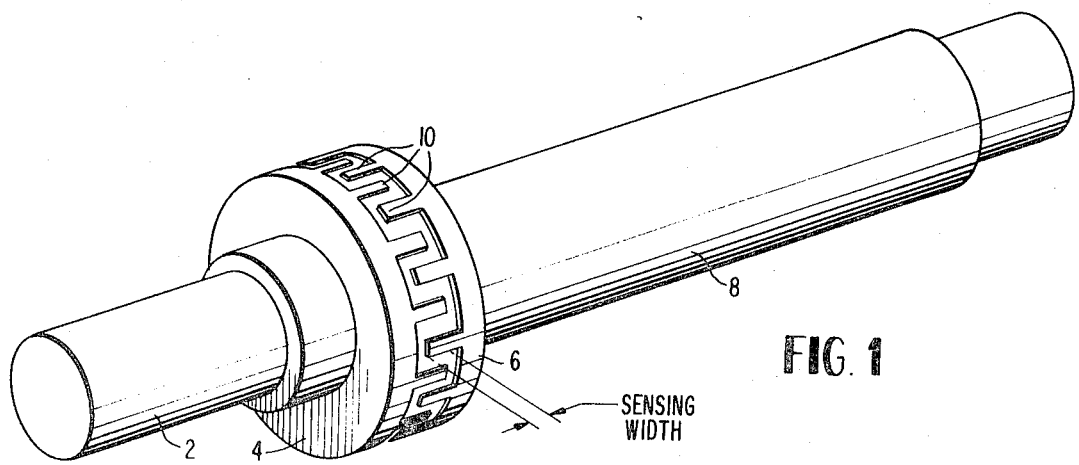

This invention relates to an apparatus for measuring torque, and more particularly to a phase displacement torque measuring system in which a variable reluctance magnetic pick-off senses the angular position between a pair of exciter wheels axially displaced on the torque shaft such that the phase relationship of the resultant AC signal is a measure of the shaft torque.

Normally, a torque shaft assembly uses two exciter wheels of magnetic steel attached to the torque transmitting shaft at different axial positions. As torque is increased, the exciter wheels experience a rotational deflection with respect to each other that is directly proportional to the applied torque. The torque sensor utilizes two magnetic pick-ups, each of which is mounted in close proximity to each of the exciter wheels, thereby yielding two nearly sinusoidal signals as the exciter wheel teeth pass the sensor pole pieces. The phase relationship of the two signals generated is directly related to the relative displacement of the exciter wheels and is therefore directly related to the applied torque. The two pick-up signals are then fed to the appropriate inputs of a torque indicator which detects the phase relationship of the incoming signals and feeds the same to a closed loop servo which displays this relationship as units of torque, percent of full torque, or other suitable measuring units. In order to determine torque accurately, however, it is necessary to determine the phase relationship of these incoming signals, and for this purpose it has been the common practice to determine the zero crossover of each of the incoming signals as a means for measuring phase displacement by phase comparative circuits. The circuitry for sensing and conditioning the torque measuring signals is quite extensive since the dual sensor pick-up demands a doubling-up on the basic circuitry used. Another complication arises from the fact that the torque shaft may become misaligned, that is, out of parallelism with the center line of the torque pick-up transducers, and this misalignment will be sensed and displayed as an increase or decrease in transmitted torque. It is the purpose of this invention to provide simplified circuitry techniques in which the conventional employment of circuitry is reduced by at least a half and in addition to completely avoid errors due to misalignment.

Accordingly, it is an object of this invention to provide a phase displacement torque measuring system in which only a single variable reluctance-type sensor is utilized with a torque measuring wheel and a reference measuring wheel.

Another object of this invention is to provide a torque measurement system utilizing phase displacement techniques in which a pair of exciter wheels and a single variable reluctance sensor is employed which provides a torque signal output unaffected by changes in shaft alignment.

It is yet an object of this invention to provide a torque measuring system utilizing phase displacement techniques employing a simplified circuit in which torque may be measured for both directions of rotation with no system alterations.

It is yet another object of this invention to provide a phase displacement torque measuring system in which a pair of exciter wheels mounted on the torque shaft form a single rotating datum source for cooperation with a single variable reluctance pick-up transducer.

According to one embodiment utilizing the principles of this invention, there is provided a torque shaft assembly having two exciter wheels, one of which is a torque wheel attached directly to the shaft and the second a reference wheel attached to a reference sleeve which, in turn, is attached to the shaft spaced from the torque wheel. Each of the exciter wheels is provided with a row of axially extending tooth members along its periphery, and the two wheels are so positioned that the teeth from one wheel are positioned between the teeth of the other wheel. The distance that the teeth of one wheel extend into the space between the teeth of the other wheel is the sensing width which is used as the datum plane for the variable reluctance sensor positioned in close proximity thereto.

Thus, while the wheels are rotated, an AC signal is produced by the sensor of which any two adjacent cycles of the signal will be controlled by the relative distance between the teeth in the sensing width depending upon the relative position between the two wheels. A zero crossover detector converts the sensor AC signal into a train of pulses which are utilized to alternately turn "off" and "on" a bistable multivibrator thus producing a rectangular waveform whose ratio of "on" time to "off" time is directly related to wheel tooth positions. The bistable multivibrator output is filtered into two DC voltages, the greater positive output of which is then carried to the input of a display portion of the system.

Figure 2:
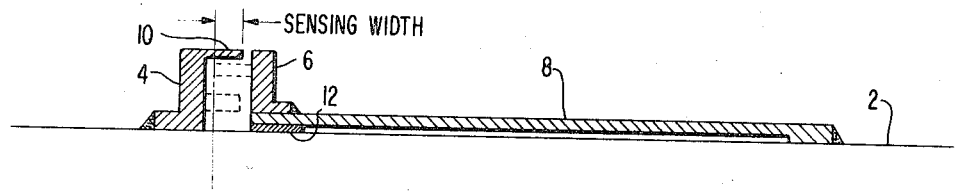
Figure 3:
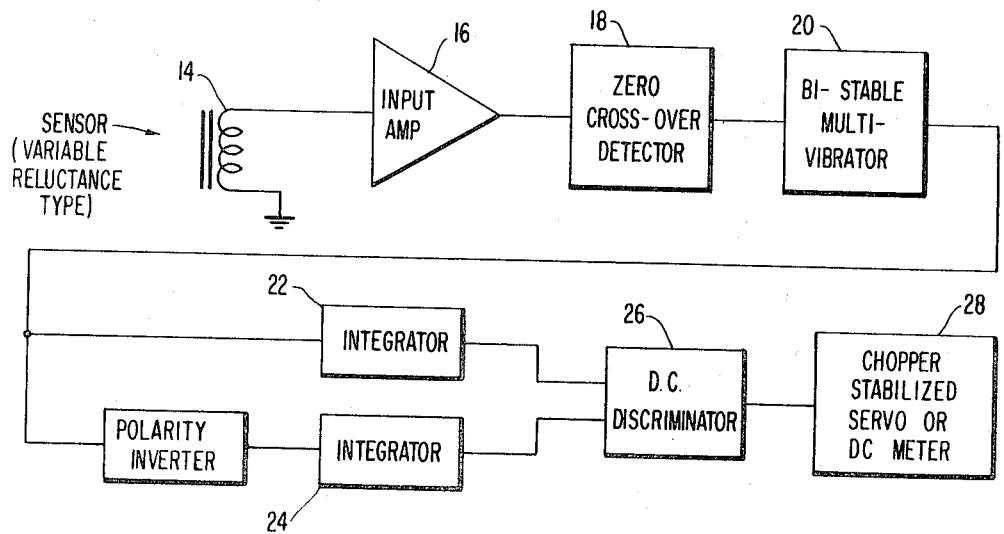

Other objects and advantages will become apparent from the following study of the specification and drawings in which:

FIG. 1 is a perspective view of the torque shaft with the exciter wheels arranged according to this invention;
FIG. 2 is a cross-sectional view of the torque shaft shown in FIG. 1;
FIG. 3 is a circuit block diagram showing the steps of processing the AC output signal;
FIG. 4 is a graph illustrating the functional timing of the output signal for a zero torque situation; and
FIG. 5 is a graph illustrating the functional timing of the output signal for a full torque situation.

Referring now to FIG. 1, there is shown a torque shaft 2 with the two exciter wheels 4 and 6 of magnetic material arranged according to the principles of this invention. The exciter wheel 4 is attached directly to the shaft 2 while the exciter wheel 6 is attached to a sleeve 8 which, in turn, is attached at one end to the shaft 2. Each of the exciter wheels is shown to have an array of axially extending teeth 10 along its periphery. It will be seen that the two wheels 4 and 6 are positioned just far enough apart so that the teeth of one wheel are positioned within the space between the teeth of the opposite wheel. The distance that each of the teeth extends into the space between adjacent teeth of the opposite wheel determines the sensing width as shown in FIG. 1.

In FIG. 2 the sensing width is shown from another perspective, again showing this width to be the distance that the teeth of one wheel extend into the space between the teeth of the other wheel. As shown, the reference sleeve 8 is provided with a bearing member 12 at its free end to take up the space between the sleeve and the shaft 2 where the reference exciter wheel 6 is supported. A variable reluctance-type pick-up sensor 14 is shown positioned in close proximity to the wheels 4 and 6 and such that the sensing width formed by the arrangement of teeth 10 on the two wheels provides a datum plane for the sensor to measure, as will be discussed below.

In FIG. 3 is shown the system for processing the AC signal output of the sensor 14. An input amplifier 16 is provided for situations in which the air gap between the sensor and the wheel teeth 10 is large, for example, over .060 inch, thus producing insufficient amplitude to properly operate the zero crossover detector circuitry. The AC signal is converted to a train of pulses by the zero crossover detecting network 18 which may be of the design shown in applicant's copending application Ser. No. 711,678, or some such other design employing conventional crossover detection methods. The detector 18 is adjusted to sense only the negative going zero crossover points of the input signal waveform. It will be understood, of course, that the zero crossover point occurs when one of the wheel teeth 10 and the sensor face are in direct alignment; this relationship is used for detection because it is the only point on the AC signal output waveform that is not displaced in time as signal amplitude changes. The detector pulses are utilized to alternately turn "off" and "on" a bistable multivibrator 20, thus producing a rectangular waveform whose ratio of "on" time to "off" time is directly related to wheel tooth positions. An integrator 22 filters the output of the multivibrator 20 thus providing a DC voltage, and the inverted bistable output provided by a polarity inverter 26 is also filtered to a DC voltage in integrator 24. This process which utilizes the inverted bistable signal as well as the straight output signal eliminates the need to synchronize the electronic system to the shaft mounted gears. The DC discriminator accepts the most positive output from the integrators 22 and 24 which is then carried to the input of the display portion of the system 28 normally comprising a chopper stabilized servo or a precision DC digital voltmeter. The voltage discrimination process provides the proper command signal to the display system 28 regardless of which wheel tooth 10 provides the first "change-of-state" command pulse to the bistable multivibrator 20.

In FIGS. 3 and 4 there is shown respectively the AC output signal processing for a zero torque situation and a full torque situation. In FIG. 4 it will be seen that the AC signal shown as curve $a$ is in its normal sinusoidal form, thus representing equal distances between the teeth 10 of the two wheels 4 and 6. The zero crossover detector circuit provides the pulses as shown on the curve $b$. These pulses represent the negative going crossover points of the signal $a$. The curve $c$ shows the bistable multivibrator output, and the curve $d$ shows the same output inverted by the polarity inverter 26. The integrator 22 output is shown by the curve $e$ as +10 volts and the integrator 24 output is shown by the curve $f$ also as +10 volts. The DC discriminator output, therefore, will be +10 volts as shown in $g$.

For the full torque situation, which represents a deflection between the wheels 4 and 6 of one quarter of one tooth to tooth space, the signal $a$ provides the pulse arrangement from the zero crossover detector shown at $b$, and the multivibrator outputs shown at $c$ and $d$ provide a +15 volt signal in the integrator 22 and a +5 volt signal in the integrator 24, such as shown at $e$ and $f$, respectively. The DC discriminator circuit will then pick-up the +15 volt signal as shown at $e$, which signal will be carried to the display portion 28 as above-described.

The system, as above-described, is virtually unaffected by changes in shaft alignment, provided that the sensing width remains under the face of the sensor 14. Further, the torque may be measured for both directions of rotation of the shaft 2 with no system alterations, so long as the centering of the reference teeth between the torque teeth is taken as the zero transmitted torque, such as shown in FIG. 4.

What is claimed is:

1. In a shaft torque measuring system, the combination comprising, a pair of toothed wheels in spaced apart relationship on said shaft, each of said wheels having axially extending spaced teeth along its periphery extending into the spaces between the teeth of the other wheel and forming therewith an interlaced array of teeth having interstices therebetween, and detector means rotatable relative to said shaft and differentially responsive to the circumferential width of alternate ones of said interstices.

2. A combination as claimed in claim 1, comprising transducer means rotatable relative to said shaft adjacent to said array for generating an alternating signal, said detector means being differentially responsive to the duration of alternate cycles of said signal.

3. A combination as claimed in claim 2, in which said detector means comprises a bistable multivibrator responsive to zero cross-overs in one sense of said alternating signal and measuring means responsive to at least one of the phases of the multivibrator output.

4. A combination as claimed in claim 3, in which said measuring means comprises an integrator circuit coupled to a D.C. measuring instrument.

5. A combination as claimed in claim 4, comprising a second integrator circuit responsive to the polarity-inversed output of said multivibrator and a D.C. discriminator selectively coupling to said D.C. measuring instrument the one of the outputs of said integrator circuits having the larger amplitude.

References Cited

UNITED STATES PATENTS

| | | | |
|---|---|---|---|
| 3,147,434 | 9/1964 | Cocker | 324—771 |
| 3,194,065 | 7/1965 | Wilson | 73—136 |
| 3,258,961 | 6/1966 | Van Manen | 73—136 |
| 3,271,666 | 9/1966 | Anderson et al. | 324—57 |
| 3,281,534 | 10/1966 | Dersch | 179—1 |
| 3,329,012 | 7/1967 | Demuth | 73—136 |

RICHARD C. QUEISSER, Primary Examiner

J. WHALEN, Assistant Examiner

U.S. Cl. X.R.

324—77